(12) United States Patent
Stiehler et al.

(10) Patent No.: US 10,982,562 B2
(45) Date of Patent: Apr. 20, 2021

(54) BEARING CHAMBER HOUSING FOR A TURBOMACHINE

(71) Applicant: MTU Aero Engines AG, Munich (DE)

(72) Inventors: Frank Stiehler, Bad Liebenwerda (DE); Georg Kempinger, Eching (DE); Juergen Kraus, Dachau (DE); Steffen Schlothauer, Erdweg (DE); Christian Liebl, Bockhorn (DE); Thomas Koebke, Eichenau (DE); Alois Eichinger, Pfaffenhofen (DE)

(73) Assignee: MTU Aero Engines AG, Munich (DE)

( * ) Notice: Subject to any disclaimer, the term of this patent is extended or adjusted under 35 U.S.C. 154(b) by 37 days.

(21) Appl. No.: 16/270,390

(22) Filed: Feb. 7, 2019

(65) Prior Publication Data

US 2019/0249569 A1 Aug. 15, 2019

(30) Foreign Application Priority Data

Feb. 9, 2018 (DE) ...................... 10 2018 202 083.3

(51) Int. Cl.
*F01D 25/16* (2006.01)
*F02C 7/06* (2006.01)
(Continued)

(52) U.S. Cl.
CPC ............ *F01D 25/162* (2013.01); *B33Y 10/00* (2014.12); *B33Y 80/00* (2014.12); *F01D 25/18* (2013.01);
(Continued)

(58) Field of Classification Search
CPC ....... F01D 25/162; F01D 25/18; F01D 25/183
See application file for complete search history.

(56) References Cited

U.S. PATENT DOCUMENTS 8,371,127 B2 * 2/2013 Durocher ................ F01D 5/082
415/115
2015/0224743 A1 8/2015 Schick et al.
(Continued)

FOREIGN PATENT DOCUMENTS

| EP | 2746542 A2 | 6/2014 |
| EP | 3214273 A1 | 9/2017 |
| EP | 3244026 A1 | 11/2017 |

OTHER PUBLICATIONS

"Construction rules for for Additive manufacturing processes processes, A basis for the Education and teaching teaching", Design Rules for Additive Manufacturing Processes Nov. 6, 2013 / Guido Adam.
(Continued)

*Primary Examiner* — Justin D Seabe
*Assistant Examiner* — Michael L Sehn
(74) *Attorney, Agent, or Firm* — Barlow, Josephs & Holmes, Ltd.

(57) ABSTRACT

The present invention relates to a bearing chamber housing for bearing a shaft of a turbomachine, comprising an additively built-up housing section and a cover, which, in each case referred to an axis of rotation of the shaft, connects axially to the housing section and has a radially extending collar, which collar axially bounds an oil space of the bearing chamber housing, wherein the cover is assembled with the housing section and is connected therewith via a weld.

5 Claims, 3 Drawing Sheets

(51) Int. Cl.
*F01D 25/18* (2006.01)
*B33Y 80/00* (2015.01)
*B33Y 10/00* (2015.01)

(52) U.S. Cl.
CPC .............. *F01D 25/183* (2013.01); *F02C 7/06* (2013.01); *F05D 2230/31* (2013.01); *F05D 2240/54* (2013.01)

(56) References Cited

U.S. PATENT DOCUMENTS

| | | |
|---|---|---|
| 2016/0281534 A1* | 9/2016 | Noel ..................... F01D 25/162 |
| 2016/0290164 A1 | 10/2016 | Liebl et al. |
| 2017/0182561 A1* | 6/2017 | Scancarello .......... B22F 3/1055 |
| 2017/0298987 A1* | 10/2017 | Ertas ..................... F16C 32/067 |
| 2017/0314468 A1 | 11/2017 | Wotzak |
| 2018/0135517 A1 | 5/2018 | Mook et al. |
| 2018/0221958 A1 | 8/2018 | Torun et al. |

OTHER PUBLICATIONS

"VDI Guidelines, Additive Manufacturing Fundamentals, terms, process descriptions Additive manufacturing processes, rapid manufacturing Basics, definitions, processes", VDI 3405, Dec. 2014.

* cited by examiner

BEARING CHAMBER HOUSING FOR A TURBOMACHINE

BACKGROUND OF THE INVENTION

Technical Field

The Present Invention Relates to a Bearing Chamber Housing for Bearing a Shaft of a turbomachine.

Prior Art

The turbomachine may involve, for example, a jet engine, e.g., a turbofan engine. Functionally, the turbomachine is divided into a compressor, combustion chamber, and turbine. Roughly speaking, in the case of the jet engine, aspirated air is compressed by the compressor and burned in the downstream combustion chamber with kerosene mixed in with it. The hot gas that arises, a mixture of combustion gas and air, flows through the downstream turbine and in this case is expanded. The compressor and the turbine are each usually constructed from a plurality of stages, each with a stator (guide vane ring) and a rotor (rotating blade ring), wherein the rotors of the turbine are driven by the hot gas. In this case, internal energy is withdrawn proportionally from the hot gas in each stage and is converted into a movement of the particular rotating blade ring and thus of the shaft. Depending on the embodiment in each case, the rotors of the compressor are joined to the rotors of the turbine by way of one or a plurality of shafts and are driven by the latter in order to perform the compression work.

The present subject relates to a bearing chamber housing for bearing a shaft, wherein the reference to a jet engine first shall not limit the generality of the concept of the invention. The turbomachine may also involve, for example, a stationary gas turbine.

SUMMARY OF THE INVENTION

The technical problem that is the basis of the present invention is to provide a particularly advantageous bearing chamber housing for a turbomachine, as well as an advantageous method for the manufacture thereof.

According to the invention, this is achieved by a bearing chamber housing and by a method for the manufacture thereof according to claim 8 the present invention. The bearing chamber housing is or will be built up generatively or additively, at least for the most part, thus generated based on a data model by selective solidifying in regions of an initially shapeless material or one of neutral shape (see below in detail). In this case, however, according to the invention, the entire bearing chamber housing is not generated in one piece, but rather a cover is attached as a separately manufactured component and joined in a material-bonded manner, in particular joined by welding. This cover has a radially extending collar that axially bounds an oil space of the bearing chamber housing.

The multi-part construction might appear at first to be a drawback, since a plurality of components need to be handled in the fabrication, especially since assembling requires maintaining adjustments of fits and the welding process may mean additional expenditure. The inventors have determined, however, that the advantages resulting due to the multi-part manufacture outweigh these disadvantages. Thus the additive build-up of the housing section can be optimized to the geometry thereof, which, for example, due to a radially external attachment flange (for mounting on the housing of the turbomachine; see below in detail) and/or one or a plurality of uptakes for ball bearings or roller bearings, etc. has a certain complexity in any event. Due to the "separation" of the cover, therefore, on the one hand, the radial collar need not be considered (additionally) during the build-up of the housing section. On the other hand, structurally and mechanically, for example, no significant disadvantages result in any case, since in relation to the rest of the bearing chamber housing, the cover or the interface to the housing section is not stressed very much mechanically during operation.

Preferred embodiments are found in the dependent claims and in the entire disclosure, wherein, in the presentation of the features, a distinction is not always made individually between device and method or use aspects; in any case, the disclosure is to be read implicitly with respect to all claim categories. If, for example, reference is made to a bearing chamber housing manufactured in a specific manner, this is always to be read also as disclosure of a corresponding manufacturing method, and vice versa.

The terms "axially" and "radially", as well as the directions belonging thereto, in the scope of this disclosure, refer to the axis of rotation of the shaft, which, when considering the turbomachine, coincides overall with the longitudinal axis thereof. The rotors rotate around the axis of rotation "circumferentially" during operation, namely in the "direction of circulation". "A" and "one" are to be read as the indefinite article and thus, unless specifically indicated otherwise, are always to be read as "at least one".

The collar bounds the oil space of the bearing chamber housing axially, thus with reference to a direction parallel to the axis of rotation. For this purpose, it extends radially (and, of course, circumferentially), which generally does not necessarily imply an exclusively radial extent or dimension; the collar also extends (slightly) obliquely, for example, (not perpendicular to the axis of rotation, but tipped). However, an exclusively radially extending collar is preferred. The material-bonded joint preferably lies in a plane perpendicular to the axis of rotation, which may be of interest, for example, with respect to a joining or welding surface that is as uniform as possible.

The additive build-up of the housing section can generally make accessible more complex geometries in comparison to a manufacture by casting technology, for example, or also can help to reduce wall thicknesses. Thus, for example, the wall thicknesses of the shell(s) of the housing section can be dimensioned according to the structural and mechanical profile specification, and thus can be reduced in comparison to a cast part, which results in a weight savings (in the case of the embodiment example, of around 200 g, for example). In the case of an aircraft engine, this can be of advantage relative to kerosene consumption. An advantageous interaction is also given effectively between the additive build-up and the welding, in that the additive manufacture makes possible thin walls, from which small joining surfaces and thus a good weldability result.

In a preferred embodiment, the cover also is or will be additively built up. Based on the multi-part manufacture relative to the housing section, when building up the cover, a direction for the build-up can be freely selected, preferably, in fact, one lying exactly opposite to the build-up direction of the housing section (see below in detail). In general, however, an additive build-up of the cover is not absolutely necessary; the latter could also be a cast part that is placed on the additively constructed housing section, for example.

In a preferred embodiment, the cover has an external sleeve section on which the collar emerges radially toward the inside. Then an axial end of this sleeve section is welded to the housing section; therefore, the material-bonded joint is arranged there. Preferably, the collar is arranged on the axially opposite end of the sleeve section (sleeve section and collar thus do not form a T-shape, for example, but rather an L-shape, when considered in an axial section).

In a preferred embodiment, the housing section has one or a plurality of sleeve-shaped shells in each case. Generally, when reference is made to a sleeve shape, this usually relates to a hollow cylindrical shape that is coaxial to the axis of rotation of the shaft (thus, in a section that is perpendicular to the axis of rotation, it is circular, at least substantially). Preferably, the housing section has a radially outer shell and a radially inner shell that is radially inside the outer shall, the latter being provided for the accommodation of the bearing. As the outer wall of the bearing chamber housing, the radially outer shell, for example, can also bound, radially toward the outside, an oil space that surrounds the bearing (the oil disposed radially outside of the bearing can create a certain shielding relative to the hot-gas channel and help reduce, for example, temperature gradients and thus mechanical stresses). In any case, presently the sleeve section of the cover can then be welded to the outer shell of the housing section. The separation relative to the housing section is thus arranged in a mechanically less stressed region thereof, e.g., in comparison to the inner shell supporting the bearing.

In a preferred embodiment, the cover has an inner sleeve section, which extends on the radially inner periphery of the collar, axially away from this collar. This inner sleeve section forms a seal carrier; thus, it can accommodate, for example, a sliding seal that is provided for sealing against the shaft. Preferably, the cover has both the outer sleeve section as well as the inner sleeve section; in particular, it then has a U-shape, when considered in an axial section.

In a preferred embodiment, a fastening flange emerging radially to the outside is disposed on the housing section, and this flange serves for fastening the bearing chamber housing and thus the entire bearing arrangement in the turbomachine. The fastening flange thus must absorb relatively large forces, which can be taken into consideration in the design in a particularly advantageous way based on the additive manufacture. Therefore, webs or struts of the fastening flange that extend away from the outer shell of the housing section can be or will be able to be optimized, for example, based on structural-mechanical simulations. They may have, for example, a variable thickness and/or an adapted inclination relative to the axis of rotation in order to obtain a specific spring effect. This may permit a compensation for vibrations (which may arise, since the bearing presents a connection site between stators and rotors). The advantages of the additive manufacture thus may particularly come to fruition here.

The invention also relates to a turbine midframe for a turbomachine, in particular a jet engine, having a presently disclosed bearing chamber housing. The turbine midframe can also be arranged in general between the combustion chamber and the turbine module(s); it is preferably designed for arranging between two turbine modules, e.g., between high-pressure and intermediate-pressure or low-pressure turbines. Then one or a plurality of bearings can be arranged in the bearing chamber housing for guiding the shaft; e.g., in the case of the exemplary embodiment, a ball bearing and a roller bearing. In this case, the housing section accommodates the bearing(s); preferably all bearings of the bearing chamber are accommodated by the housing section. The cover preferably bears a sliding ring seal.

As already mentioned, the invention also relates to a method for manufacturing a presently disclosed bearing chamber housing or turbine midframe. In this case, the housing section of the bearing chamber housing will be built up additively and then the cover will be placed thereon as a separate component and welded to the housing section. Preferably, the cover will also be built up additively, and in fact, particularly preferred, with a build-up direction that lies opposite to that of the housing section (referred to the orientation of the assembled components).

In general, both in the case of the housing section as well as of the cover, the additive build-up preferably takes place in a powder bed process. In this case, the material from which the housing section or the cover is manufactured will be applied sequentially, layer by layer, in powder form, wherein, for each layer, a region that is determined in advance based on the data model (the component geometry; see above) is selectively solidified. The solidification takes place through melting by means of a radiation source, wherein in general, for example, an electron beam source is also conceivable. Melting is preferably carried out with a laser source, thus a laser beam; the additive build-up is thus a selective laser melting (SLM).

In a preferred embodiment, the build-up direction of the housing section relative to the separating surface lies between housing section and cover such that the separating surface does not extend over a plurality of layers. The entire separating surface lies in exactly one of the layers, which results in a largely uniform and thus well weldable surface. Preferably, if the cover is also additively built up, the build-up direction thereof is also preferably selected so that the separating surface lies in exactly one of the layers. Whether it is the cover or the housing section, the layer in question can be the last layer that is actually built up; on the other hand, however, several layers may still also lie over it, i.e., when mechanical post-processing will still be carried out after the additive build-up.

When an overhang arises in the additive, layer-wise build-up of the housing section and/or of the cover, this overhang will be limited in the preferred embodiment. A possible overhang shall enclose by the layers an angle of 60° at most, increasing in the order given preferably at most 50°, 40° or 30°. In general, of course, an avoidance of overhangs is preferred (0°), which, however, is not always possible. Considered in this case is the angle that encloses a surface normal line with the layers and that is located in the region of the overhang in the surface of the component; concretely, with a plane that includes an interface between two layers previously solidified.

In a preferred embodiment, the housing section and the cover are each mechanically post-processed before they are welded together. This particularly may concern the joining surfaces and help to improve weldability. Alternatively or additionally, a radially inner wall of the inner sleeve section that then accommodates the sliding ring seal on the cover, for example, can also be post-processed, and/or the collar can be post-processed "from inside", which is possible prior to the welding. In the case of the housing section, for example, the inner shell provided for the accommodation of the bearing can be post-processed; in particular, grooves, etc. can be introduced for fixing the bearing in place. Further, for example, also in the region of an overhang, i.e., in the case of a fastening flange, built-up material can be abraded in order to limit this overhang. In general, a certain material abrasion results with the post-processing; for example, a milling, turning or broaching is possible, and also, for example, a grinding.

In a preferred embodiment, the cover and the housing section will be welded together by means of electron beam welding. Alternatively, a friction welding would in general also be conceivable, for example.

The invention also relates to the use of a presently disclosed bearing chamber housing or turbine midframe for a turbomachine, in particular for a jet engine. The bearing chamber housing then accommodates the shaft of the turbomachine, which rotates around the axis of rotation during operation; the oil space of the bearing chamber housing is filled with oil.

BRIEF DESCRIPTION OF THE DRAWINGS

In the following, the invention will be explained more closely on the basis of an exemplary embodiment, wherein the individual features in the scope of the independent or coordinated claims may also be essential to the invention in other combinations, and also in addition, no distinction is made individually between the different claim categories.

Taken individually.

DESCRIPTION OF THE INVENTION

Figure 1:
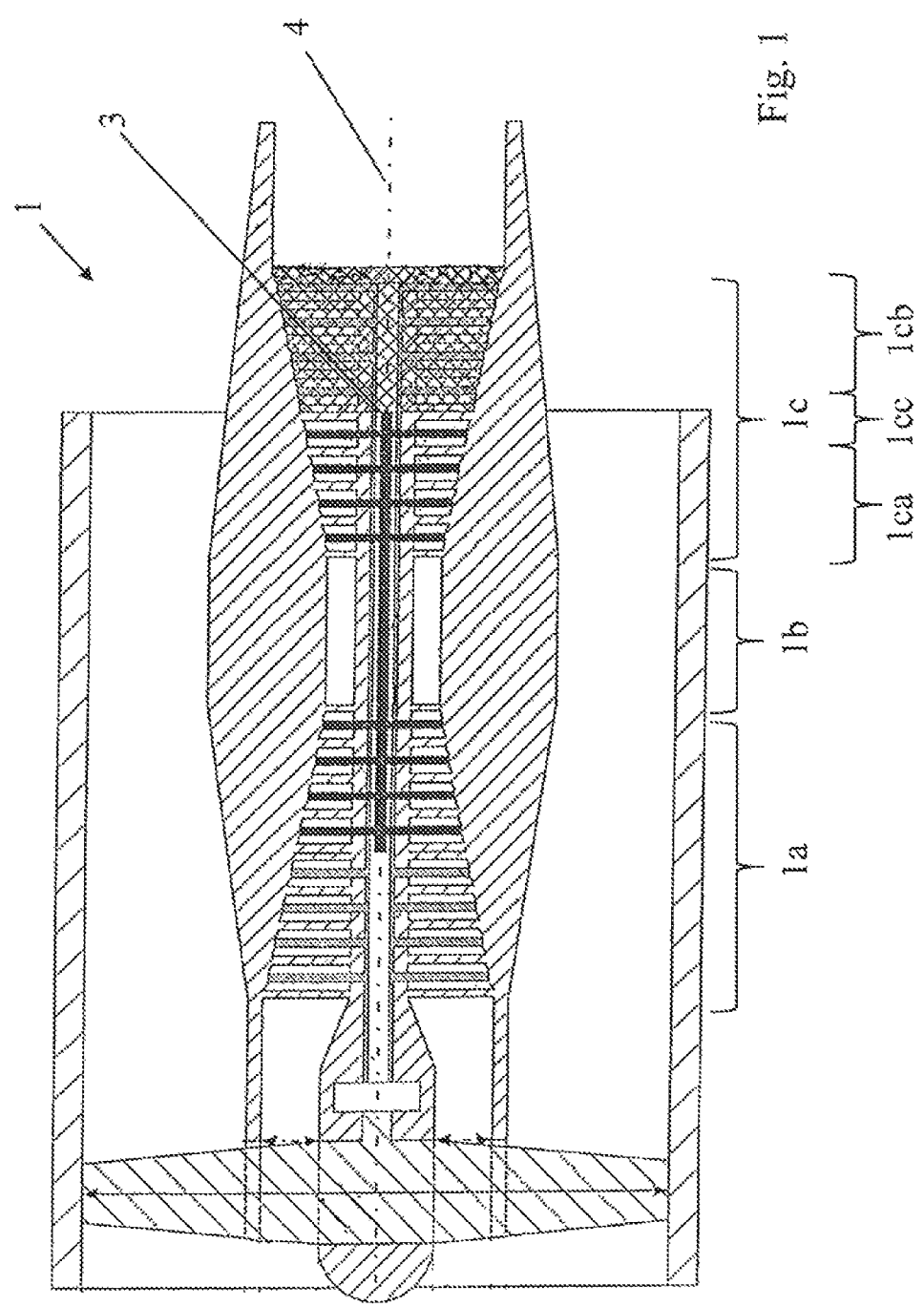
FIG. 1 shows a jet engine in an axial section.

FIG. 1 shows a turbomachine 1 in schematic view, concretely a jet engine. Functionally, the turbomachine 1 is divided into compressor 1a, combustion chamber 1b, and turbine 1c. Both the compressor 1a as well as the turbine 1c are each constructed from two modules in the present case. Between a high-pressure turbine module 1ca directly downstream from the combustion chamber 1b and a low-pressure or intermediate-pressure turbine module 1cb is found the turbine midframe 1cc. The rotors of the turbine modules 1ca, cb each rotate around an axis of rotation 4 on a shaft 3. A bearing or bearings for this shaft 3 is or are arranged in the turbine midframe 1cc.

Figure 2:
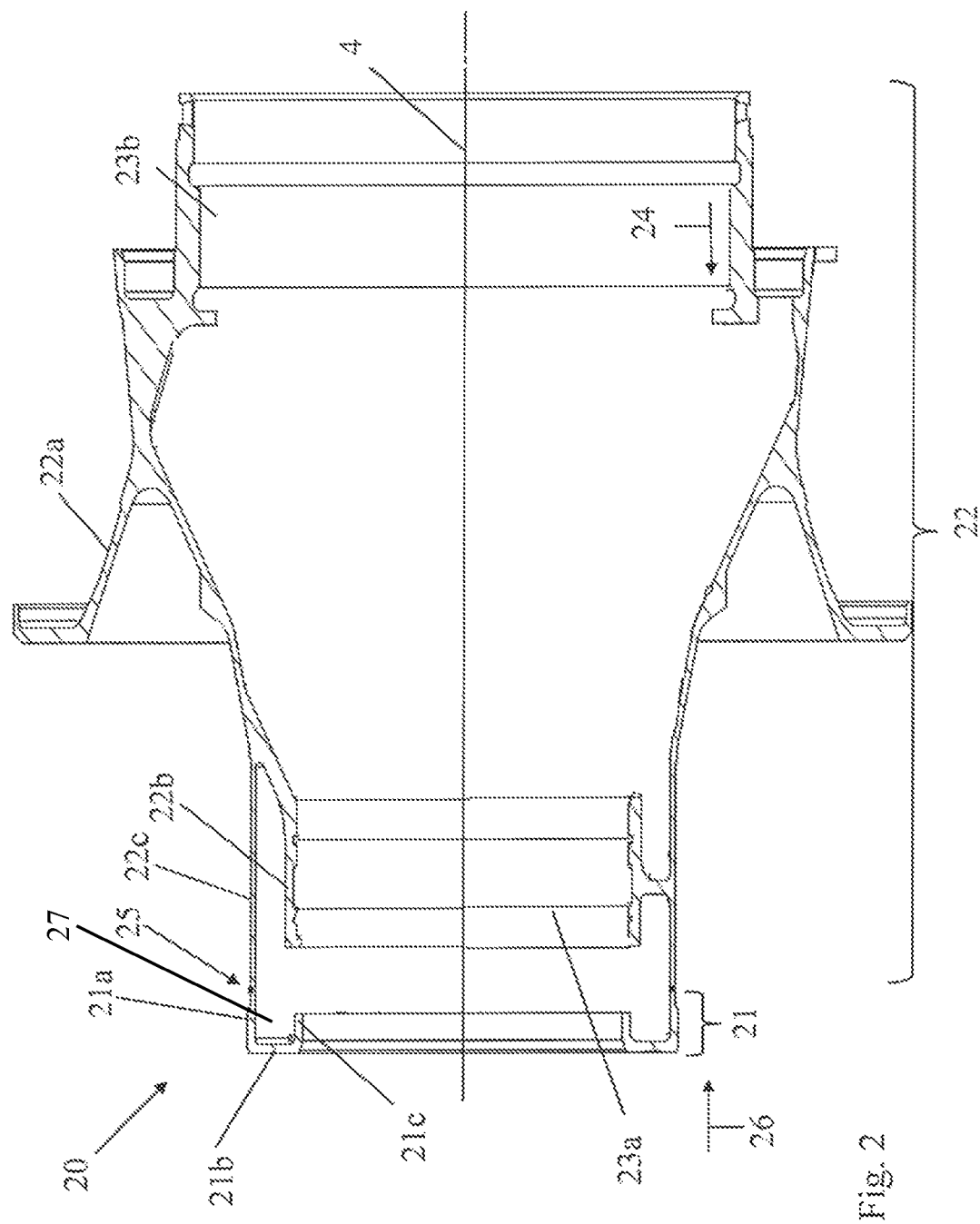
FIG. 2 shows a bearing chamber housing according to the invention in an axially sectioned lateral view.

FIG. 2 shows a bearing chamber housing 20 according to the invention. The latter has a housing section 22, in which two uptakes 23 for bearings (not shown for reasons of clarity) are formed. One of the uptakes 23a accommodates a roller bearing, and the other uptake 23b accommodates a ball bearing. The shaft 3 is then guided rotatably in these bearings.

The housing section 22 is a component additively built up in a powder bed process, wherein the build-up direction 24 in FIG. 2 points from right to left. The cover 21 in this case is not built up with it, but rather is manufactured separately and is joined to the housing section 22 by way of a material-bonded joint; in the present exemplary embodiment, by way of a weld 25. The manufacture of the cover 21 also takes place in a powder bed process, wherein the build-up direction 26 lies opposite to that of the housing section 22.

With this two-part construction, on the one hand, the geometry of the housing section 22 can be taken into account; additionally, the latter has, for example on the outside, a fastening flange 22a for the fastening of the bearing chamber housing in the turbine midframe 1cc. The cover 21 is divided into an outer sleeve section 21a, a collar 21b extending away from the latter radially toward the inside, and an inner sleeve section 21c. Since the build-up direction 26 of the cover 21 is selected opposite to the build-up direction 24 of the housing section 22 (from left to right in FIG. 2), thus it is built up beginning with the collar 21b, in principle, the cover 21 can be built up free of overhangs. In the case of a one-part build-up, in contrast, its inner side would hardly be accessible for a mechanical post-processing; therefore, supporting structures, etc. could only be poorly removed.

The inner sleeve section 21c of the cover 21 takes up a sliding ring seal (not shown), which then seals against the shaft 3. The collar 21b bounds an oil space 27 axially. If the bearing chamber housing 20 is filled with oil, the latter also surrounds the uptake 23a; it thus surrounds the roller bearing (which creates a certain heat shield). Therefore, oil is also disposed between an inner shell 22b that forms the uptake 23a and an outer shell 22c of the housing section 22. The weld 25 is found between the outer sleeve section 21a of the cover 21 and the shell 22c of the housing section 22. The separation between cover 21 and housing section 22 is placed in the bearing chamber housing 20 in such a way that the mechanical stress on the weld 25 is minimized. Based on the additive manufacture, the wall thicknesses of the outer sleeve section 21a and the outer shell 22c are also comparatively thin, which is of advantage with respect to the joining surface, which also remains small.

Figure 3:
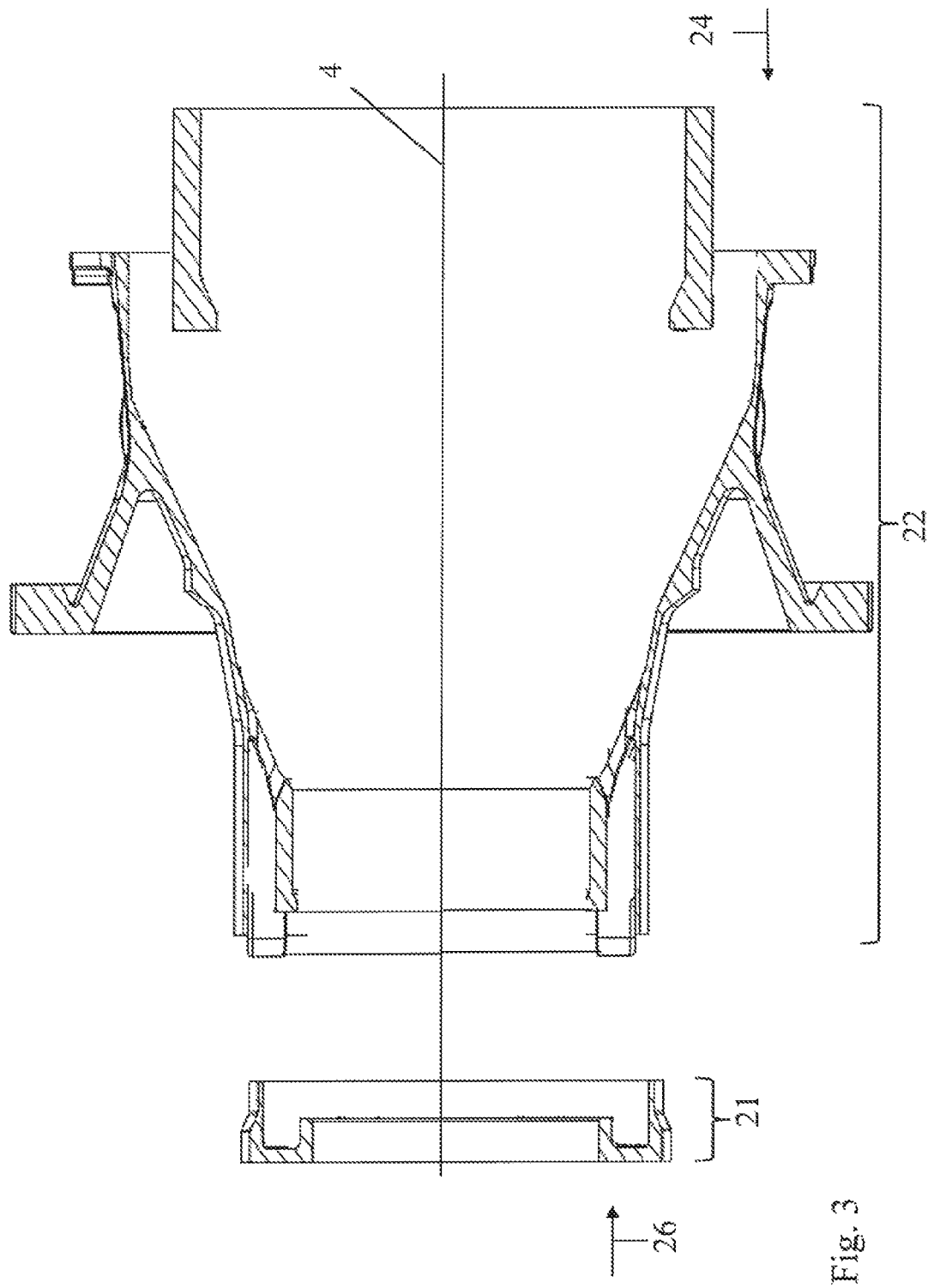
FIG. 3 shows an intermediate stage in the manufacture of the bearing chamber housing according to FIG. 2.

FIG. 3 shows the cover 21 and the housing section 22 directly after the additive build-up. Prior to the welding, the two components are each still mechanically post-processed; thus, for example, the grooves are produced in the uptakes 23a,b, and material is also generally abraded from the additively produced surfaces. which can increase the surface quality and thus can reduce the risk of initial crack sites. Also in this regard, an advantage of the two-part construction is demonstrated; the surfaces of the components are better accessible prior to assembling. The latter also applies with respect to an inspection; for example, a visual inspection of the surfaces is easier.

What is claimed is:

1. A method for manufacturing a bearing chamber housing, comprising the steps of:
    additively building-up a housing section;
    providing a cover that connects axially, with respect to an axis of rotation of a shaft, to the housing section and has a radially extending collar which collar axially bounds an oil space of the bearing chamber housing; wherein the cover is assembled with the housing section and is joined therewith via a material-bonded joint via a weld;
    assembling the cover with the housing section and is welded therewith,
    wherein the housing section and the cover are each additively built up layer by layer in a powder bed process, wherein the material-bonded joint and therefore a separating surface lie in the bearing chamber housing between the housing section and the cover such that the separating surface extends exclusively in exactly one of the layers.

2. The method according to claim 1, wherein the cover is built up with a build-up direction, which, when referred to an orientation of the housing section and of the cover relative to one another in the assembled state, lies opposite to a build-up direction by which the housing section is additively built up.

3. The method according to claim 1, wherein the housing section and/or the cover are built up additively layer by layer in a powder bed process, wherein, if an overhang arises in the additive build-up, the overhang encloses with the layers an angle of at most 60°.

4. The method according to claim 1, wherein the housing section and/or the cover is mechanically post-processed before the cover is welded to the housing section.

5. The method according to claim 1, wherein the cover is welded to the housing section by electron beam welding.

\* \* \* \* \*